United States Patent
Hsieh et al.

(10) Patent No.: US 8,358,393 B2
(45) Date of Patent: Jan. 22, 2013

(54) THIN FILM TRANSISTOR ARRAY FOR A LIQUID CRYSTAL DISPLAY DEVICE AND RELATED MANUFACTURING AND OPERATION METHODS

(75) Inventors: Chih-Yung Hsieh, Tainan (TW); Chien-Hong Chen, Tainan (TW); Jian-Cheng Chen, Tainan (TW)

(73) Assignee: Chimei Innolux Corporation, Miao-Li County (TW)

( * ) Notice: Subject to any disclaimer, the term of this patent is extended or adjusted under 35 U.S.C. 154(b) by 245 days.

(21) Appl. No.: 12/482,589

(22) Filed: Jun. 11, 2009

(65) Prior Publication Data

US 2009/0310076 A1   Dec. 17, 2009

(30) Foreign Application Priority Data

Jun. 11, 2008   (TW) .............................. 97121726 A

(51) Int. Cl.
*G02F 1/1343* (2006.01)
(52) U.S. Cl. ............ 349/147; 349/38; 349/39; 349/129; 349/144
(58) Field of Classification Search ................... 349/144, 349/143, 38, 39, 129
See application file for complete search history.

(56) References Cited

U.S. PATENT DOCUMENTS

| | | | | |
|---|---|---|---|---|
| 6,407,791 | B1 * | 6/2002 | Suzuki et al. ................. | 349/129 |
| 6,936,845 | B2 * | 8/2005 | Kim et al. ........................ | 257/59 |
| 6,995,394 | B2 * | 2/2006 | Hong et al. ..................... | 257/59 |
| 7,990,504 | B2 * | 8/2011 | Lee et al. ....................... | 349/141 |
| 2004/0233368 | A1 * | 11/2004 | Kim et al. ..................... | 349/139 |
| 2006/0146243 | A1 * | 7/2006 | Nakanishi et al. ............ | 349/139 |
| 2006/0164565 | A1 * | 7/2006 | Lee et al. ........................ | 349/43 |
| 2006/0285028 | A1 * | 12/2006 | Shin ................................ | 349/43 |
| 2007/0279542 | A1 * | 12/2007 | Kim et al. ........................ | 349/38 |
| 2008/0084514 | A1 * | 4/2008 | Park et al. ....................... | 349/38 |

* cited by examiner

*Primary Examiner* — Edward Glick
*Assistant Examiner* — Sang Nguyen
(74) *Attorney, Agent, or Firm* — Trop, Pruner & Hu, P.C.

(57) ABSTRACT

In one embodiment of an invention concerning liquid crystal display devices, a first pixel electrode of a thin film transistor (TFT) array substrate may overlap a slit of a second pixel electrode of the TFT array substrate but not overlap another slit of the second pixel electrode. This may help induce a multi-domain electric field without having to precisely position a common electrode of a color filter substrate and the TFT array substrate. This may prevent position errors, enhance display quality, produce a wider viewing angle, and lower color shift sometimes associated with conventional liquid crystal display devices and methods.

9 Claims, 24 Drawing Sheets

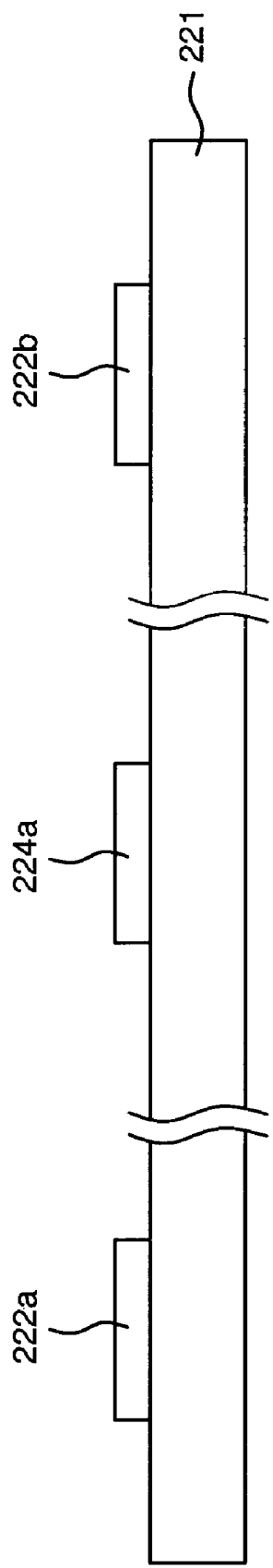
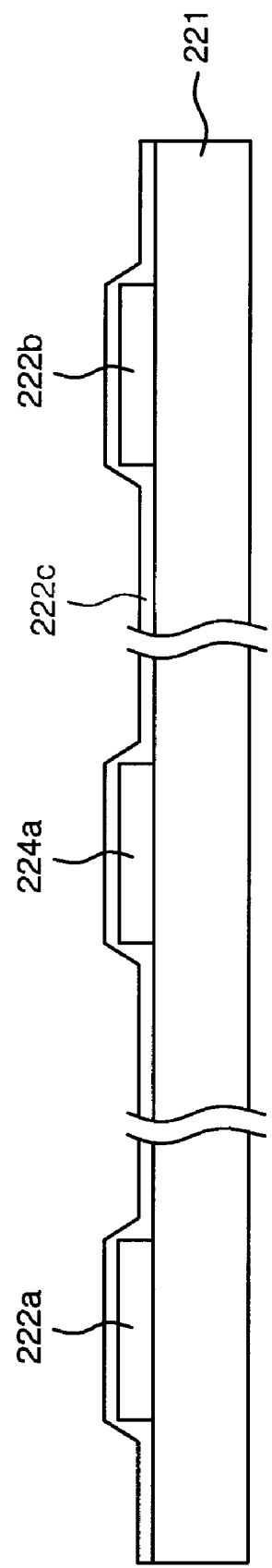

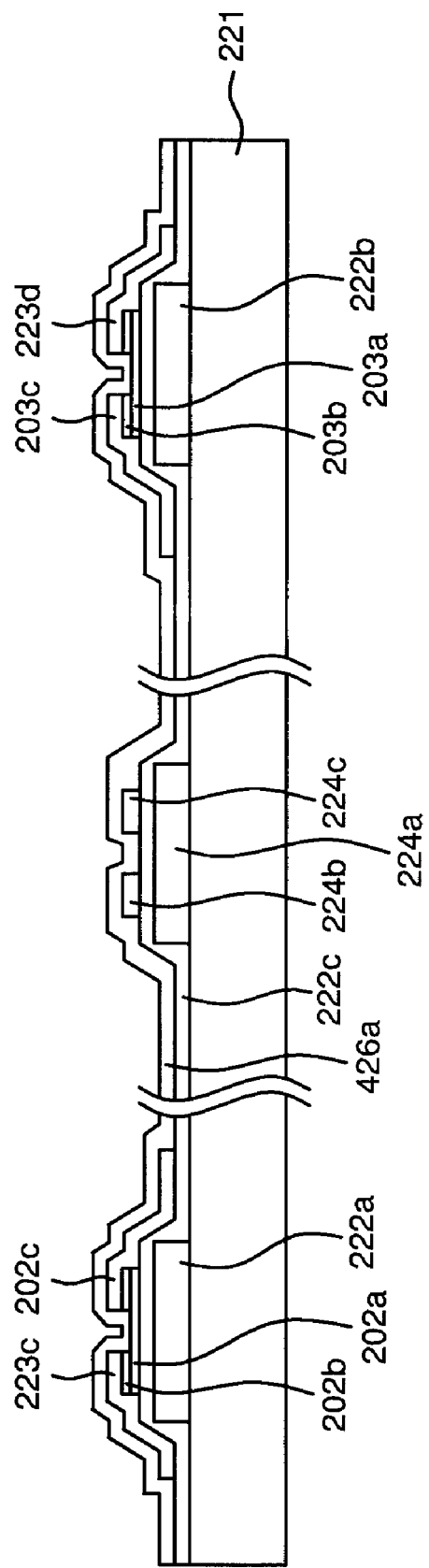

THIN FILM TRANSISTOR ARRAY FOR A LIQUID CRYSTAL DISPLAY DEVICE AND RELATED MANUFACTURING AND OPERATION METHODS

CROSS-REFERENCE TO RELATED APPLICATION

Pursuant to 35 U.S.C. §119, this application claims priority to Taiwan Application Serial No. 97121726, filed Jun. 11, 2008, the subject matter of which is incorporated herein by reference.

BACKGROUND

Liquid crystal displays (LCD) have been widely applied in electrical products due to the rapid progress of optical and semiconductor technologies. With their advantages of high image quality, compact size, light weight, low driving voltage, and low power consumption, LCDs have been introduced into portable computers, mobile phones, personal digital assistants and color televisions.

Currently, an LCD panel may include a color filter (CF) substrate and a thin film transistor (TFT) array substrate. The CF substrate may include a plurality of color filters and a common electrode. The TFT array substrate may include parallel scanning lines, parallel data lines, TFTs, and pixel electrodes. The scanning lines may be horizontally aligned and orthogonal to the data lines. An adjacent pair of scanning lines and an adjacent pair of data lines may intersect to define a pixel area.

Many LCDs utilize liquid crystal (LC) molecule alignments to control ray transmissions and consequently have an inherently narrowed viewing angle, especially with large LCDs. To broaden the viewing angle, one may pattern the Indium Tin Oxide (ITO) electrodes of the CF substrate and the pixel electrodes of the TFT array substrate to establish a plurality of different electrode regions. The different electrode regions may induce a multi-domain electric field to align LC molecules on multi-domains and thereby achieve a broadened view angle.

However, when the patterned CF and TFT array substrates are assembled, a position error may occur between the two substrates whereby the substrates are not properly oriented with respect to one another. The position error may affect the performance of the assembled LCD panel (e.g., display quality, light transmittance, response time) and may also result in unstable LC molecule alignment and image retention.

BRIEF DESCRIPTION OF THE DRAWINGS

The accompanying drawings are included to provide a further understanding of various embodiments of the invention, and are incorporated in and constitute a part of this specification. The drawings illustrate embodiments of the invention and, together with the description, serve to explain the principles of the invention.

FIGS. 4A-J are schematic diagrams for manufacturing a TFT array substrate according to an embodiment of the invention;

FIGS. 6A-D are schematic diagrams for manufacturing a TFT array substrate according to an embodiment of the invention.

DETAILED DESCRIPTION

The following description refers to the accompanying drawings. Among the various drawings the same reference numbers may be used to identify the same or similar elements. While the following description provides a thorough understanding of various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions, well known devices, circuits, and methods have been omitted to avoid clouding the description of various embodiments of the invention with unnecessary detail.

Figure 1:
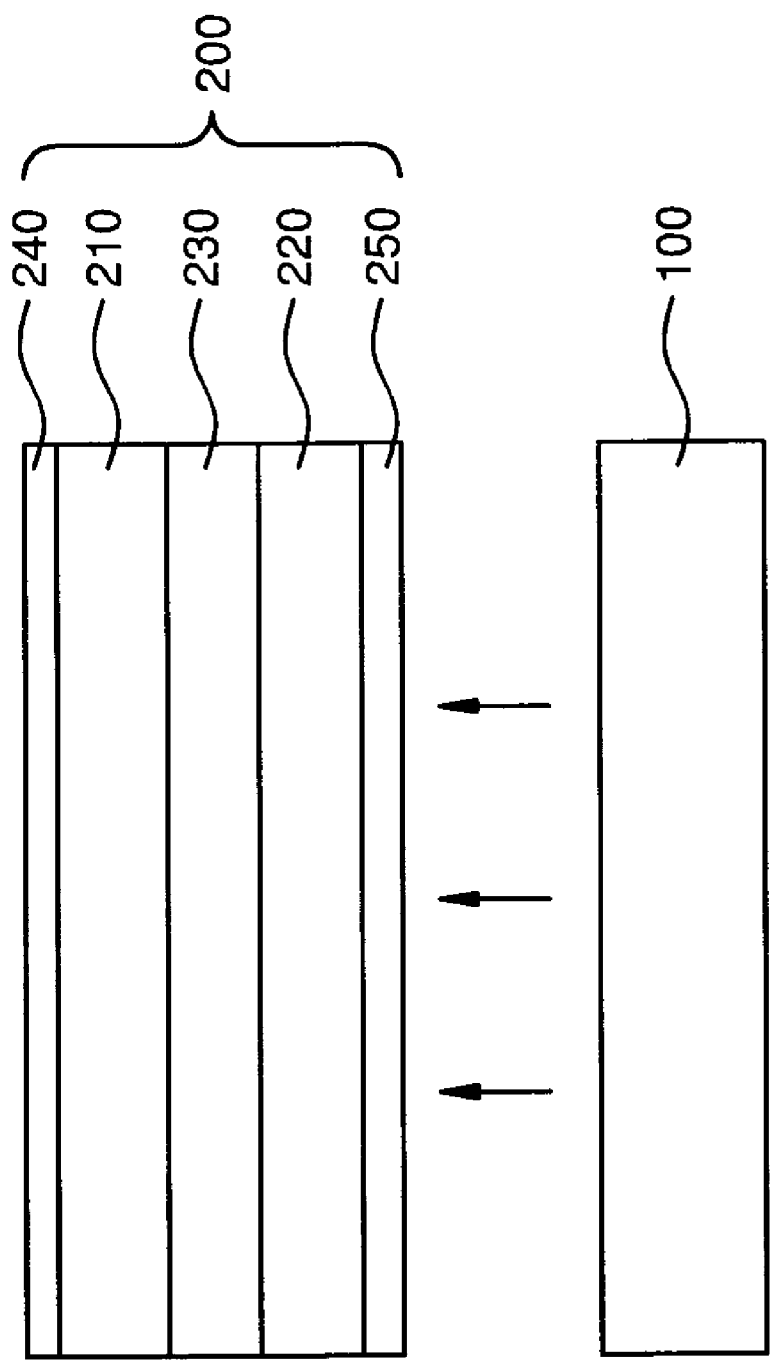
FIG. 1 is a cross-sectional view of an LCD apparatus according to an embodiment of the invention.

FIG. 1 is a cross-sectional view of an LCD apparatus according to an embodiment of the invention. The LCD apparatus includes backlight module 100 and LCD panel 200. Backlight module 100 may be disposed opposite to LCD panel 200. Backlight module 100 may be, for example, an edge or bottom lighting backlight module. Backlight module 100 may include one or more optical films (not shown) for optical performance improvement. The one or more optical films may include, for example, a diffuser, prism sheet, turning prism sheet, brightness enhancement film, dual brightness enhancement film, diffused reflective polarizer film or any combination thereof. The light source (not shown) of backlight module 100 may be, for example, a cold cathode fluorescent lamp (CCFL), hot cathode fluorescent lamp (HCFL), light-emitting diode (LED), organic light emitting diode (OLED), or electro-luminescence (EL) to provide LCD panel 200 with lighting.

LCD panel 200 may include CF substrate 210, TFT array substrate 220, LC layer 230, first polarizer 240, and second polarizer 250. CF substrate 210 may be disposed opposite TFT array substrate 220. LC layer 230 may be formed between CF substrate 210 and TFT array substrate 220. TFT array substrate 220 may include an alignment layer (e.g. polyemid) in contact with LC layer 230 for orientation of LC molecules. First polarizer 240 may be disposed on one side of CF substrate 210 and opposite to a light-emitting side of TFT array substrate 220. Second polarizer 250 may be disposed on one side of TFT array substrate 220 and opposite to a light-incident side of CF substrate 210. When backlight module 100 provides LCD panel 200 with backlighting, the backlight may pass through LCD panel 200 from second polarizer 250 to first polarizer 240. In some embodiments of the invention, a CF and TFT array may be disposed on the same substrate, such as a CF on array (COA).

Figure 2A:
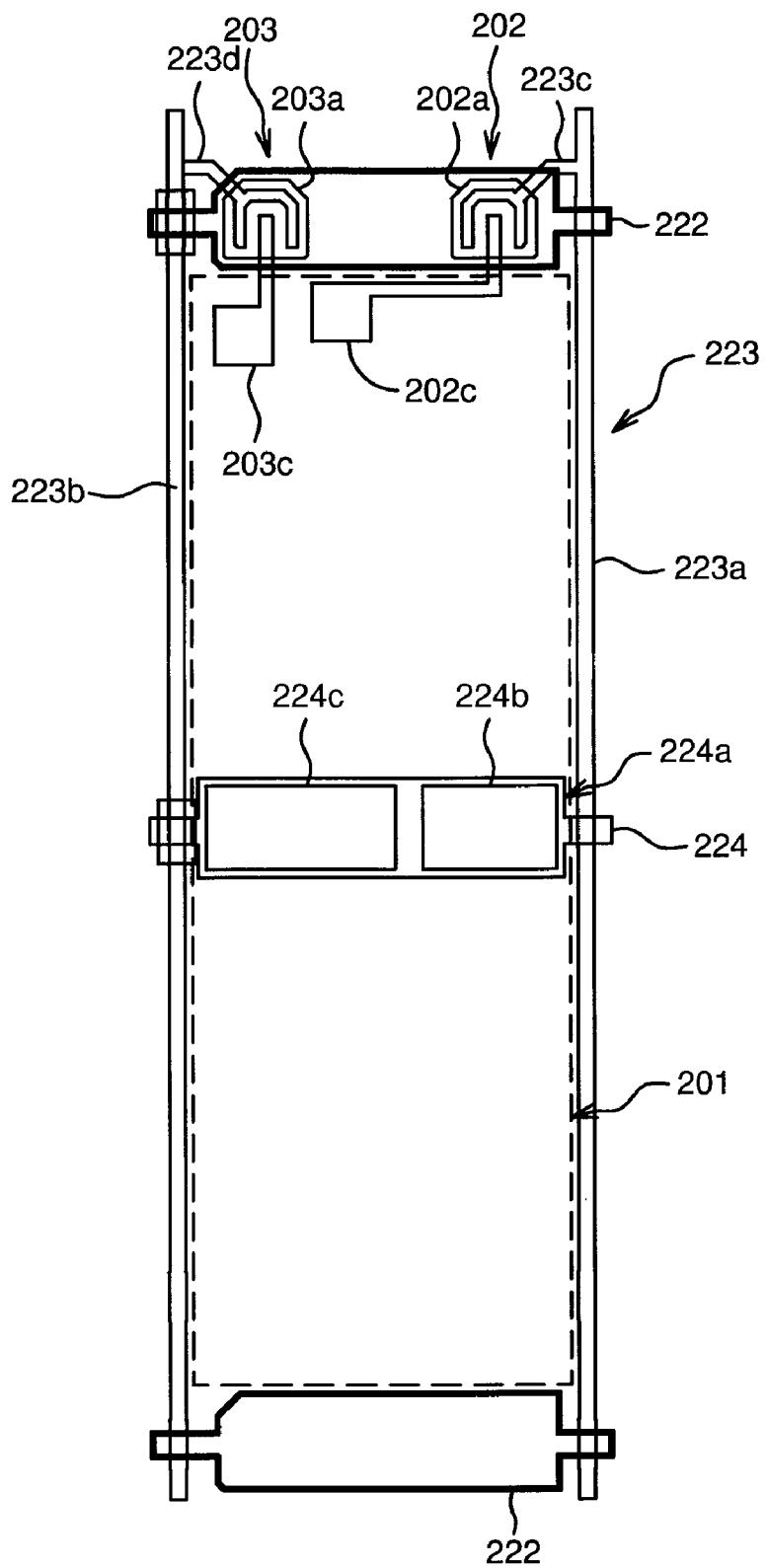
FIG. 2A is a top view of a pixel region of a TFT array substrate according to an embodiment of the invention.
Figure 2B:
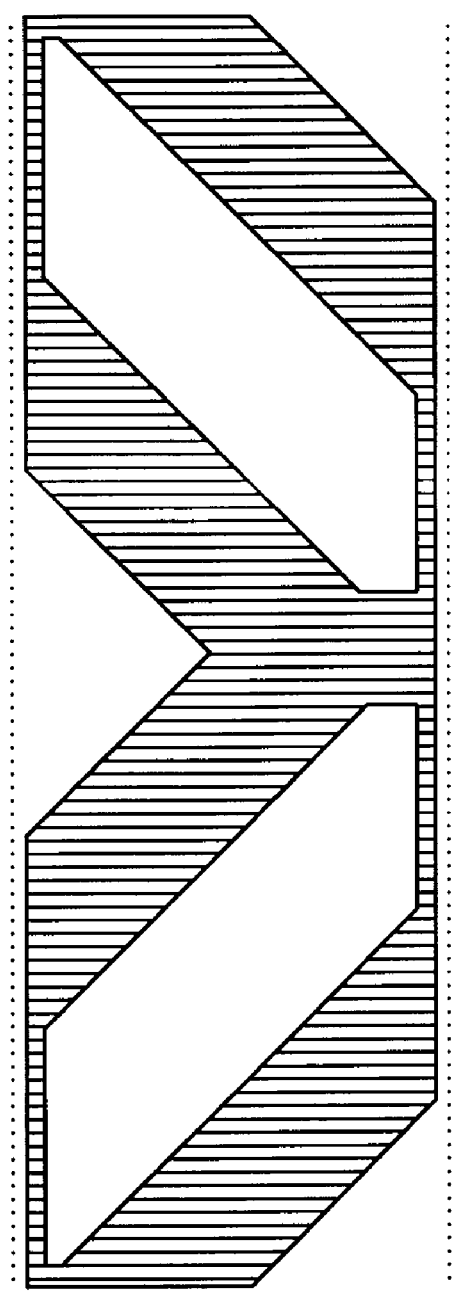
FIG. 2B is a top view of a pixel electrode of a TFT array substrate according to an embodiment of the invention.
Figure 2C:
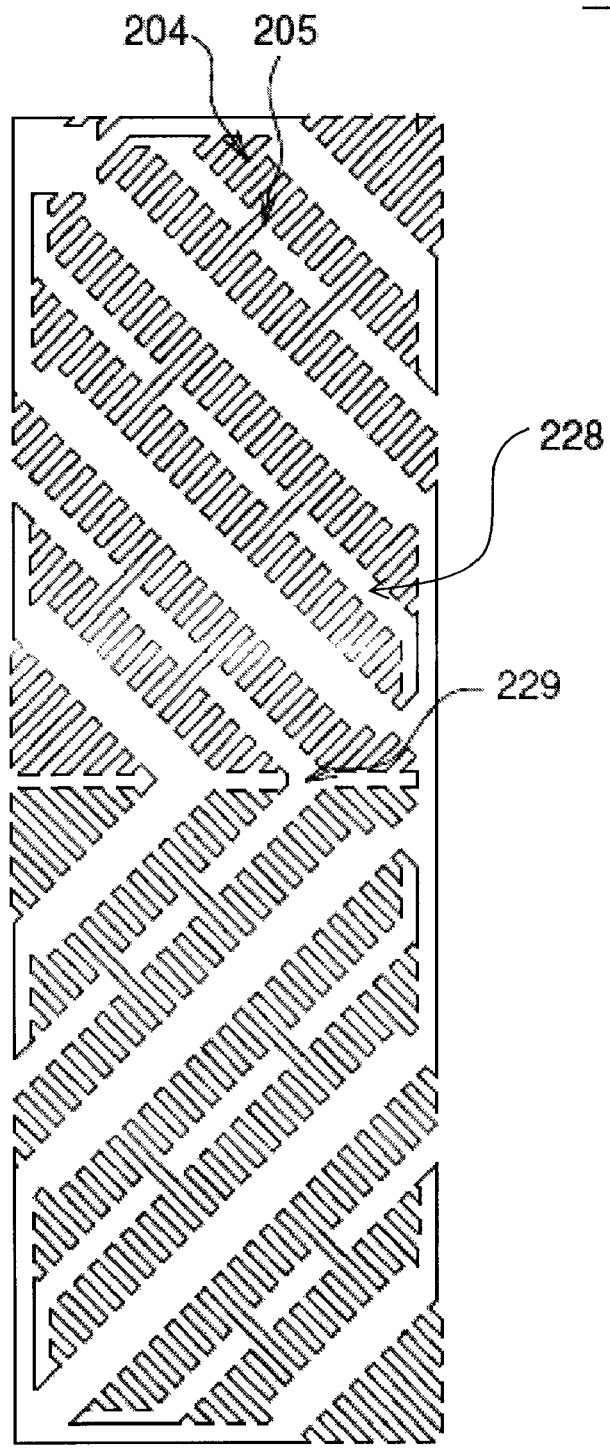
FIG. 2C is a top view of a pixel electrode of a TFT array substrate according to an embodiment of the invention.
Figure 2D:
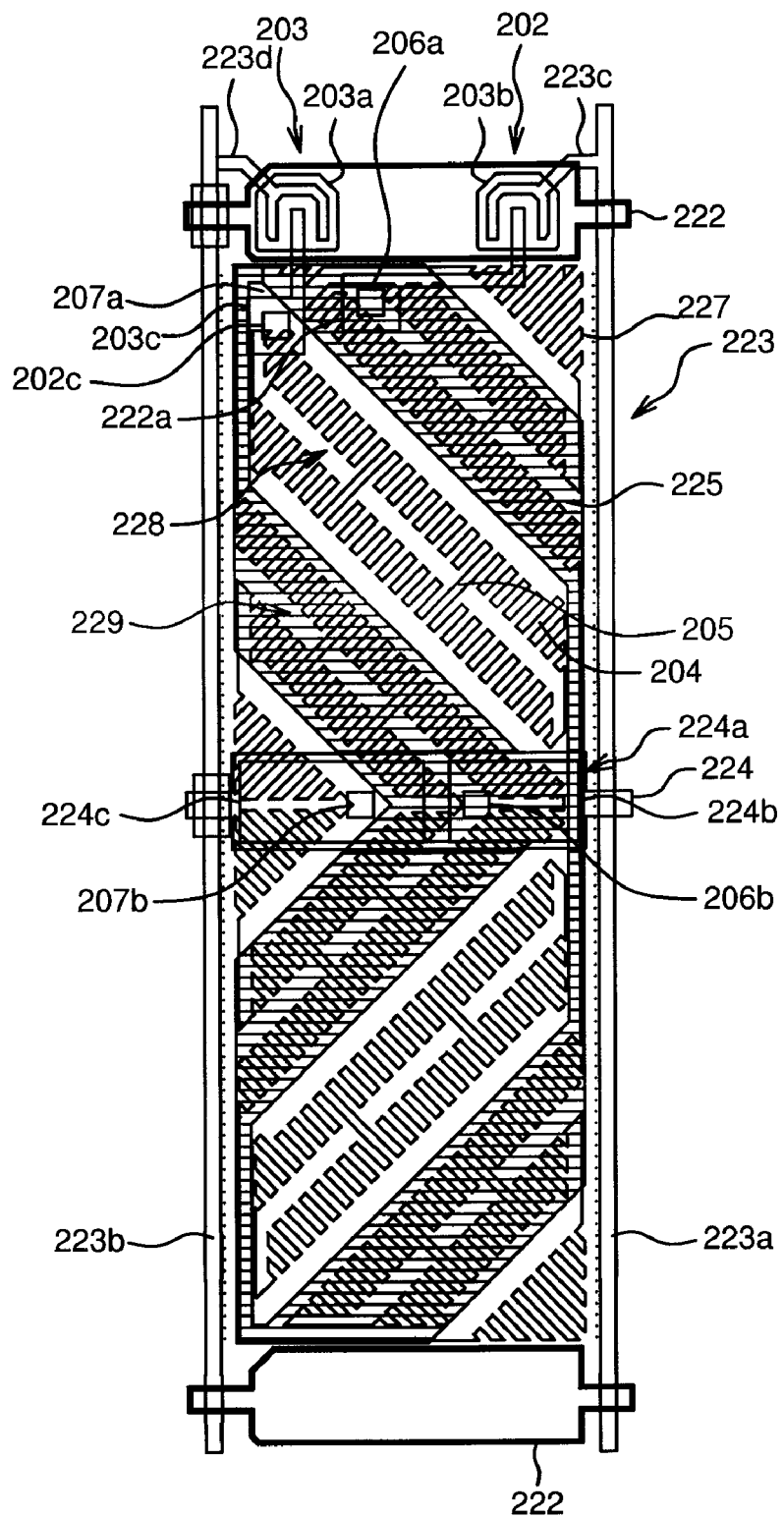
FIG. 2D is a layout view of a pixel region of a TFT array substrate according to an embodiment of the invention.
Figure 3:
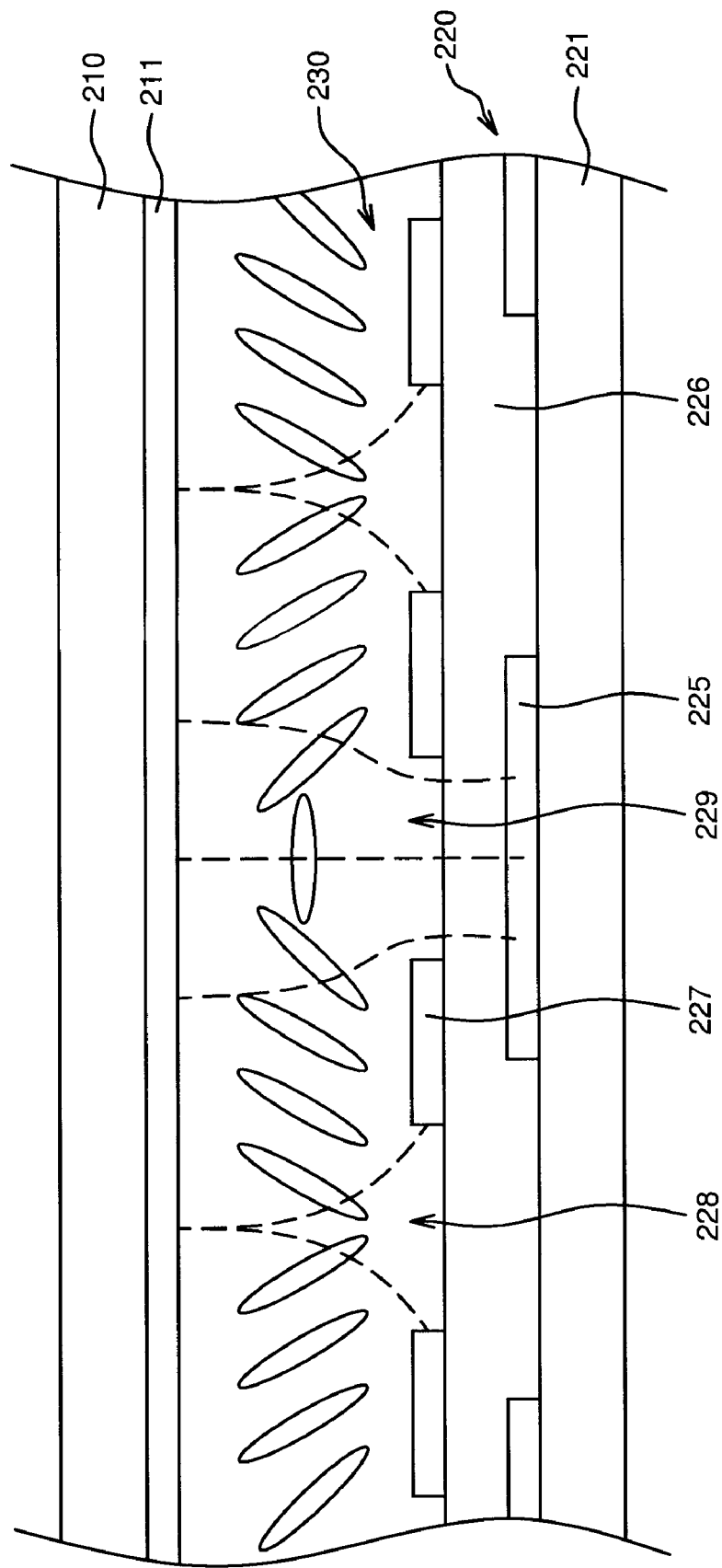
FIG. 3 is a partial cross-sectional view of an LCD panel according to an embodiment of the invention.

In various embodiments of the invention, FIG. 2A is a top view of a pixel region of a TFT array substrate, FIG. 2B is a top view of first pixel electrode 225, FIG. 2C is a top view of second pixel electrode 227, FIG. 2D is a layout view of a pixel region of a TFT array substrate, and FIG. 3 is a partial cross-sectional view of an LCD panel.

Regarding FIGS. 2A-D and 3, TFT array substrate 220 may include substrate 221, gate line or lines 222, data line or lines 223, and storage capacitor line or lines 224. Substrate 221 may include, for example, a glass substrate or a flexible transparent substrate. Gate lines 222 and data lines 223 may be orthogonally oriented with one another (e.g., crisscrossed) on the substrate, thereby forming numerous pixel regions 201 arranged on the array. Each pixel region 201 may include at least one TFT to be electrically connected to adjacent gate line 222 and adjacent data line 223. The material of gate lines 222 and storage capacitor lines 224 may be include, for example, Al, Ag, Cu, Mo, Cr, W, Ta, Ti, and/or alloys thereof. The material of data lines 223 may include, for example, Mo, Cr, Ta, T, and/or alloys thereof. In one embodiment of the invention, the material of data lines 223 is heat-resistant metal. Storage capacitor lines 224 may be parallel (i.e., generally parallel) to gate lines 222 and may form storage capacitors, each of which may be disposed in pixel regions 201 to maintain the voltage of first pixel electrodes 225 and second pixel electrodes 227 within a predetermined range for a predetermined period after shutting down (i.e., turning off) the TFT.

Pixel region 201 may include first pixel electrode 225 and second pixel electrode 227. Electrodes may include, for example, electrically conductive and transparent material, such as ITO, indium zinc oxide (IZO), aluminum zinc oxide (AZO), gallium-doped zinc oxide (GZO), transparent conducting oxide (TCO), or zinc oxide (ZnO).

In one embodiment of the invention, gate lines 222, data lines 223, first pixel electrodes 225, and second pixel electrodes 227 may be formed individually. In one embodiment of the invention, the material for gate lines 222 and/or data lines 223 may be different from the material included in first pixel electrodes 225 and the second pixel electrodes 227. In one embodiment of the invention, a resistance of the material included in gate lines 222 and/or data lines 223 may be different (e.g., lower) than a resistance of the material included in first pixel electrodes 225 and/or second pixel electrodes 227.

First pixel electrodes 225 may be formed on substrate 221. Electrode insulating layer 226 may be formed on first pixel electrodes 225. Second pixel electrodes 227 may be formed on electrode insulating layer 226 and insulated from first pixel electrodes 225. In one embodiment of the invention, one or more first pixel electrodes 225 may be formed in a V-shape. First pixel electrodes 225 may include openings or slits. In one embodiment of the invention, the area of each first pixel electrode 225 may be generally in a range from ⅓ to ½ of the area of each pixel region 201. The material of the electrode insulating layer 226 may be transparent insulating material, such as inorganic insulating material (e.g., silicon nitride or silicon oxide), organic insulating material, and/or any combination thereof.

In one embodiment of the invention, second pixel electrodes 227 may be positioned based on the location of first pixel electrodes 225. One or more second pixel electrodes 227 may include at least one first slit or opening 228 and at least one second slit or opening 229. First slit 228 and each first pixel electrode 225 may be "non-overlapped." In other words, no single vertical axis intersects both first slit 228 and first pixel electrode 225. Second slit 229 may be formed in a "V" shape and may correspond to first pixel electrode 225 so that second slit 229 "overlaps" with first pixel electrode 225. In other words, a single vertical axis intersects both first slit 228 and first pixel electrode 225, but first slit 228 does not necessarily contact first pixel electrode 225 directly. For example, in one embodiment of the invention first slit 228 of second pixel electrode 227 may be formed over an opening of first pixel electrode 225 (e.g., non-hashed space in FIG. 2B) and thus, first slit 228 of second pixel electrode 227 and first pixel electrode 225 may be "non-overlapped." In an embodiment of the invention, a slit (e.g., 228 in FIG. 2c) may be an "enclosed slit" such that the slit includes a contiguous perimeter defined by second pixel electrode 227.

In one embodiment of the invention, LC layer 230, sandwiched between CF substrate 210 and TFT array substrate 220, may be operated in a vertical-alignment mode.

In FIG. 2D first TFT 202 and second TFT 203 may be disposed in each pixel region 201. First pixel electrode 225 may be electrically connected to first TFT 202. Second pixel electrode 227 may be electrically connected to second TFT 203. Storage capacitor line 224 may include one or more storage electrodes 224a. One or more first auxiliary storage metallic layers 224b and one or more second auxiliary storage metallic layers 224c may be disposed in each pixel region 201 and on (i.e., over) storage electrode 224a. An insulating layer may be formed for auxiliary storage metallic layers 224b and 224c and storage electrode 224a to enhance the capacitance of the storage capacitor. Data lines 223 may include one or more first data lines 223a and one or more second data lines 223b, wherein first data line 223a may include first source electrode 223c and second data line 223b may include second source electrode 223d. First TFT 202 may electrically connect to gate line 222 and first data line 223a, and second TFT 203 may electrically connect to gate line 222 and second data line 223b.

In one embodiment of the invention, first slit 228 and second slit 229 of second pixel electrode 227 may include one or more finger-shaped structures 204 and one or more connection portions 205. Finger-shaped structures 204 may be formed in first slit 228 and/or second slit 229 for improving optical characteristics. Connection portions 205 may be formed in first slit 228 and/or second slit 229 to form one or more sub-slits to, for example, limit and control singular points formed in LC layer 230 to reduce image retention.

In one embodiment of the invention, when inducing a multi-domain electric field first pixel electrode 225 may electrically connect to a first voltage level from first TFT 202, and second pixel electrode 227 may electrically connect to a second voltage level from second TFT 203. The first voltage level may be different (e.g., higher) than the second voltage level. Also, the electric field between common electrode layer 211 of CF substrate 210 and second pixel electrodes 227 of TFT array substrate 220 may be adjusted to induce a multi-domain electric field and thereby broaden the view angle. Furthermore, since first pixel electrode 225 may overlap second slit 229 of second pixel electrode 227, but not overlap first slit 228 of second pixel electrode 227, an electric field relative to first slit 228 can differ from the electric field relative to second slit 229. Thus, the deflection angles of the LC molecules relative to first slits 228 and second slits 229 may differ from each other. Thus, optical transmittances of LC layer 230 relative to first slits 228 and second slits 229 may differ from each other and may lower any color shift in pixel regions 201 and/or enhance colorific quality and achieve a wider viewing angle. Thus, both slits 228, 229 contribute to the transmittances of the pixel in one embodiment of the invention.

FIGS. 4A-J are schematic diagrams for manufacturing a TFT array substrate according to an embodiment of the invention. First substrate 221 is provided. First TFTs 202, second TFTs, first storage capacitors and second storage capacitors may be formed on substrate 221. Gate lines 222 and storage capacitor lines 224 may be formed on substrate 221, and first gate electrodes 222a, second gate electrodes 222b, and storage electrodes 224a may be formed on substrate 221. First gate electrode 222a and second gate electrode 222b may be portions of gate line 222. First gate electrode 222a may correspond to first TFT 202 and second gate electrode 222b may correspond to second TFT 203.

In FIG. 4B gate insulating layer 222c may be formed on first gate electrode 222a, second gate electrode 222b, and storage electrode 224a. Gate insulating layer 222c may include, for example, silicon nitride and/or silicon oxide which may be formed with plasma enhanced chemical vapor deposition (PECVD).

Figure 4C:
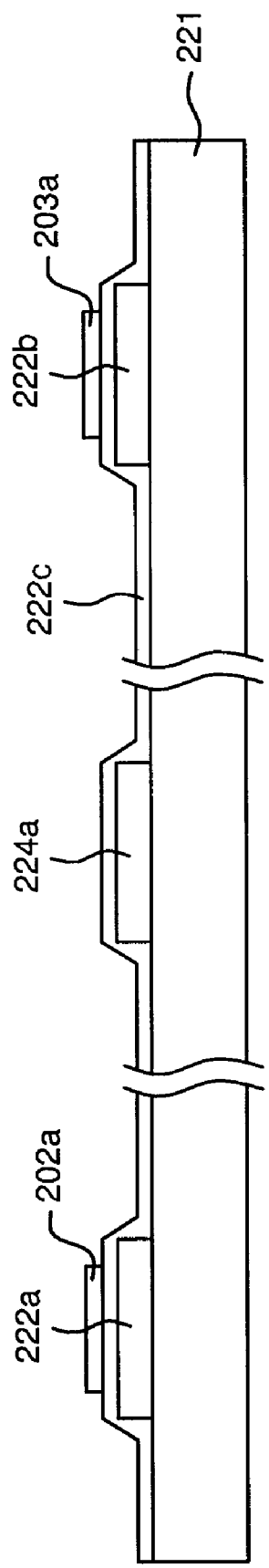

In FIG. 4C first semiconductor island 202a and second semiconductor island 203a may be formed on gate insulating layer 222c. First semiconductor island 202a may be disposed on (i.e., over) first gate electrode 222a and second semiconductor island 203a may be disposed on second gate electrode 222b. First semiconductor island 202a and second semiconductor island 203a may be made of, for example, amorphous silicon (a-Si) and/or polycrystalline silicon.

Figure 4D:
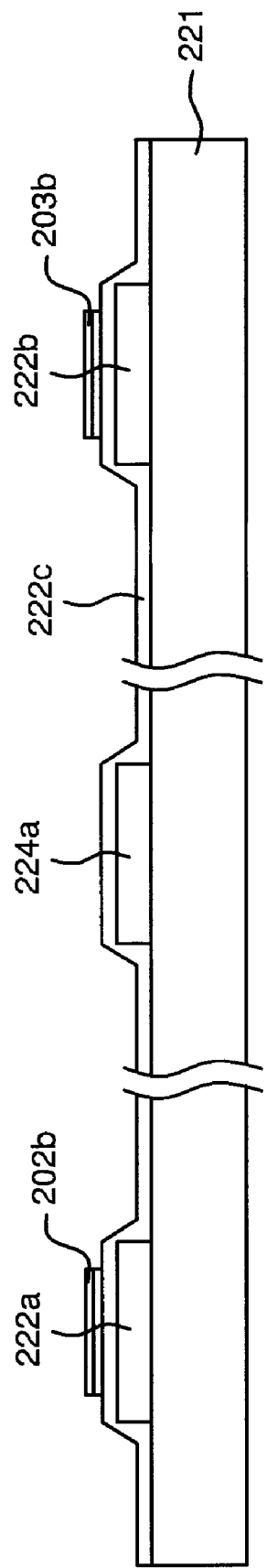

In FIG. 4D first ohmic contact layer 202b may be formed on first semiconductor island 202 and second ohmic contact layer 203b may be formed on second semiconductor island 203a. First ohmic contact layer 202b and second ohmic contact layer 203b may include N+ a-Si (or silicide) heavily doped with N dopant (such as phosphorous) using, for example, ion implantation or chemical vapor deposition methods.

Figure 4E:
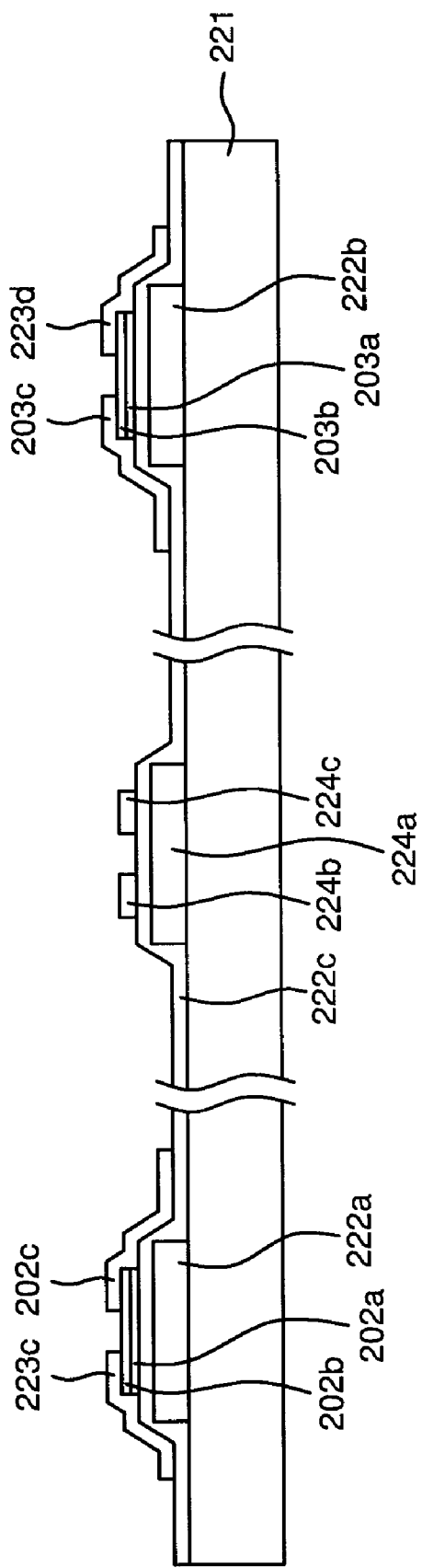

In FIG. 4E first data line 223a (not shown), second data line 223b (not shown), first drain electrode 202c, second drain electrode 203c, first auxiliary storage metallic layer 224b, and second auxiliary storage metallic layer 224c may be formed. First source electrode 223c and first drain electrode 202c of first data line 223a may be formed on first ohmic contact layer 202b. Second source electrode 223d and second drain electrode 203c of second data line 223b may be formed on second ohmic contact layer 203b. First auxiliary storage metallic layer 224b and second auxiliary storage metallic layer 224c may be formed on gate insulating layer 222c and positioned above storage electrode 224a. A metallic layer may be formed and patterned using photolithography and etching to form first data line 223a, second data line 223b, first drain electrode 202c, second drain electrode 203c, first auxiliary storage metallic layer 224b, and second auxiliary storage metallic layer 224c. In one embodiment of the invention, the metallic layer may include Mo, Al, Cr, Ta, Ti and/or alloys thereof. Furthermore, the metallic layer may be a multi-layer structure with heat-resistant film and lower resistance film, such as a dual-layer structure with molybdenum nitride and Al films. First auxiliary storage metallic layer 224b, gate insulating layer 222c, and storage electrode 224a may form a first storage capacitor and second auxiliary storage metallic layer 224c, gate insulating layer 222c, and storage electrode 224a may form a second storage capacitor.

Figure 4F:
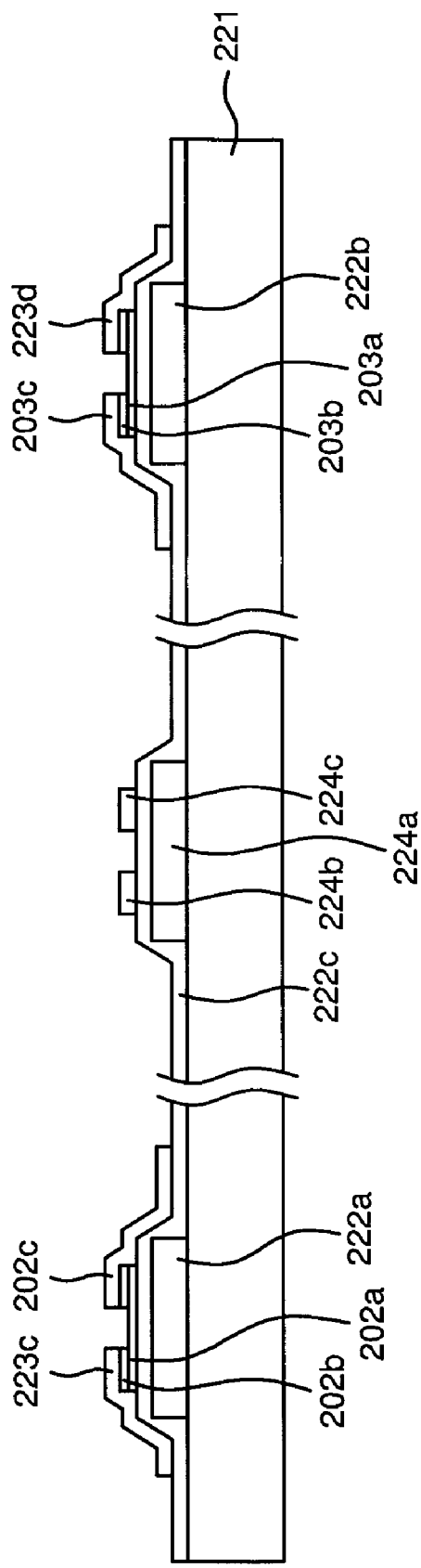

In FIG. 4F portions of first ohmic contact layer 202b, between first source electrode 223c and first drain electrode 202c, may be removed, and portions of second ohmic contact layer 203b, between second source electrode 223d and second drain electrode 203c, may be removed. Also, portions of first semiconductor island 202a and second semiconductor island 203a may be exposed to form channels for first TFT 202 and second TFT 203.

Figure 4G:
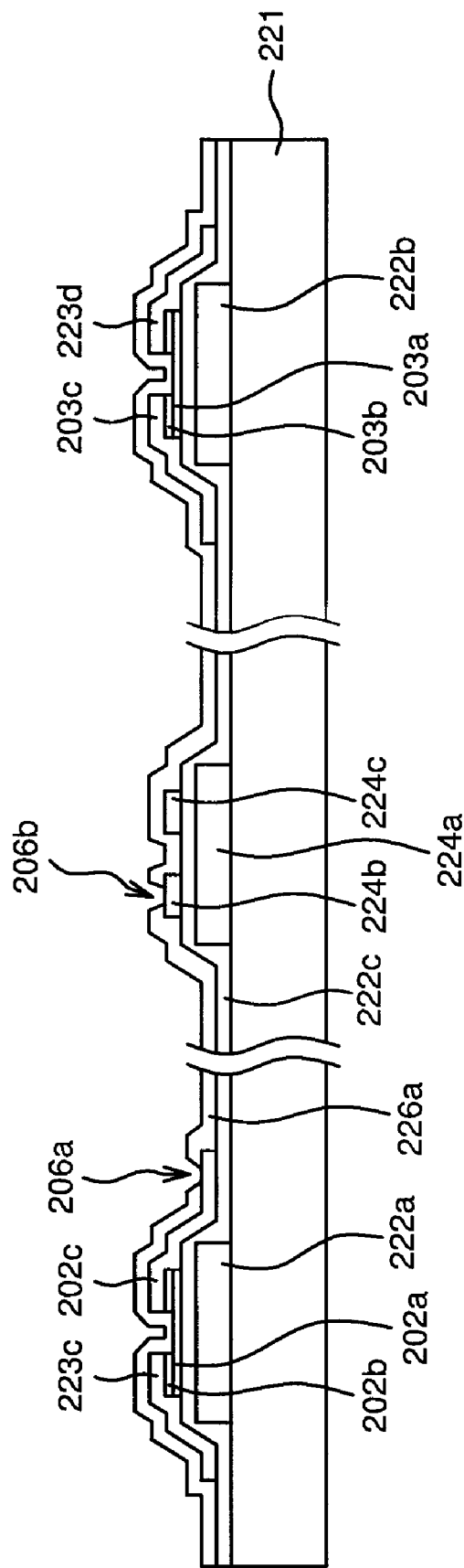

In FIG. 4G insulating layer 226a may be formed on first TFT 202, second TFT 203, and the first and second storage capacitors. Insulating layer 226a may include a plurality of first contact holes 206a and 206b which may respectively expose portions of first drain electrode 202c and portions of first auxiliary storage metallic layer 224b. First contact holes 206a and 206b may include, for example, inclined or ladder-shaped sidewalls.

Figure 4H:
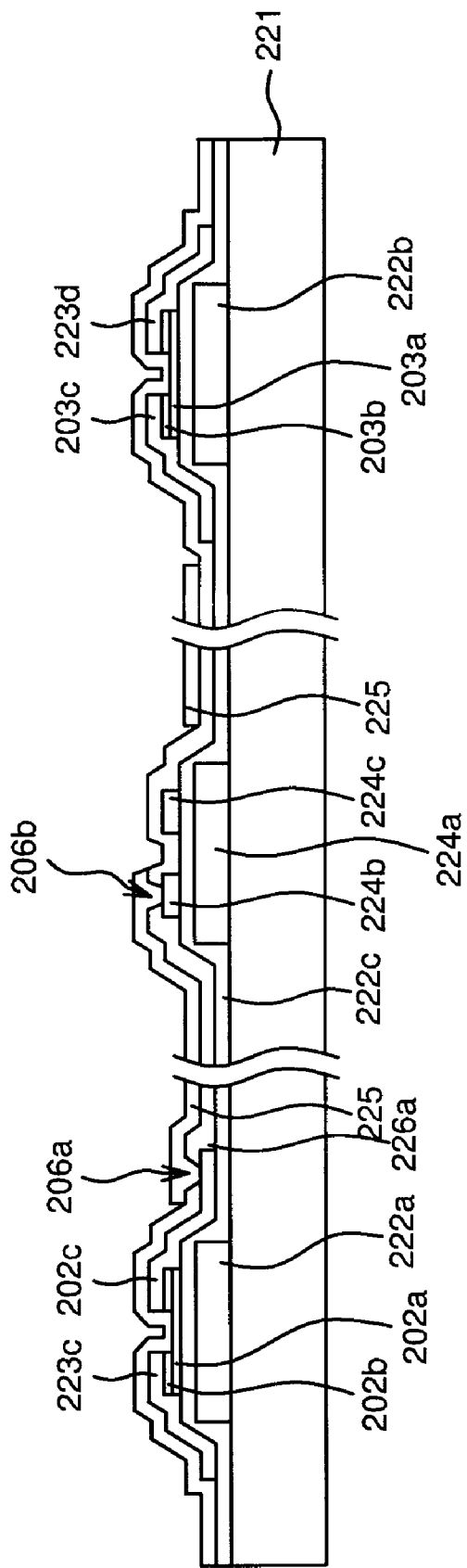

In FIG. 4H first pixel electrode 225 may be formed on insulating layer 226a and cover first contact holes 206a and 206b to electrically connect respectively to first drain electrode 202c of first TFT 202 and first auxiliary storage metallic layer 224b of the first storage capacitor.

Figure 4I:
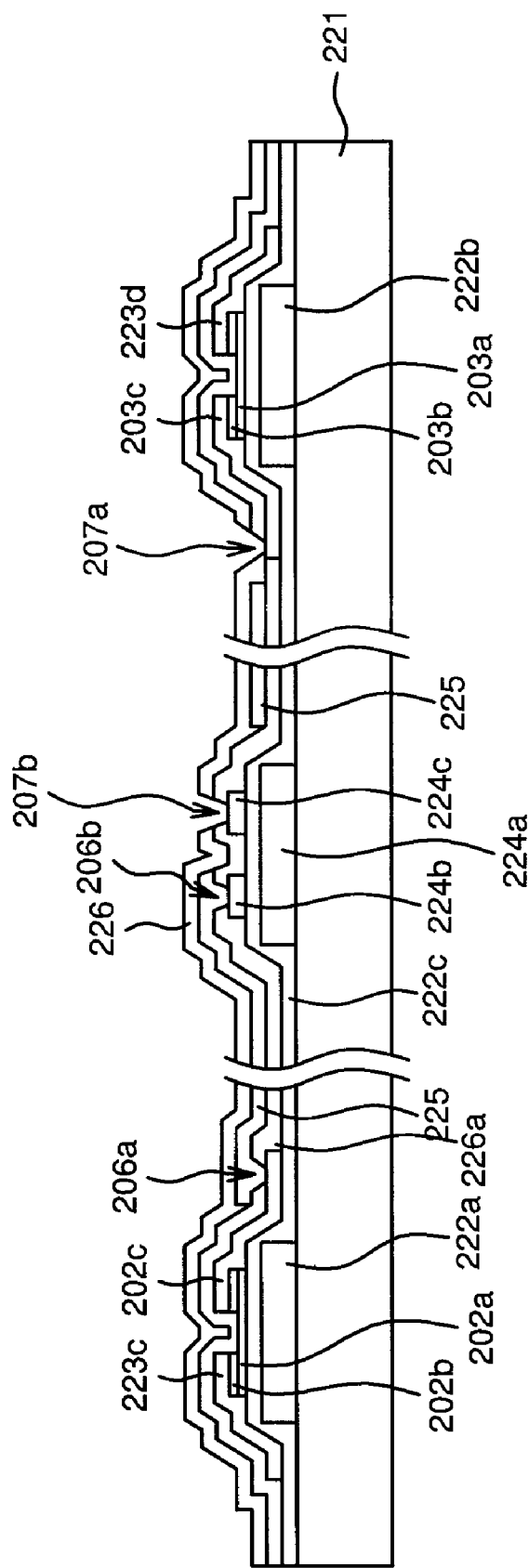

In FIG. 4I electrode insulating layer 226 may be formed on insulating layer 226a and first pixel electrode 225. Electrode insulating layer 226 may include second contact holes 207a and 207b which may respectively expose portions of second drain electrode 203c and second auxiliary storage metallic layer 224c. Second contact holes 207a and 207b may include, for example, inclined or ladder-shaped sidewalls.

Figure 4J:
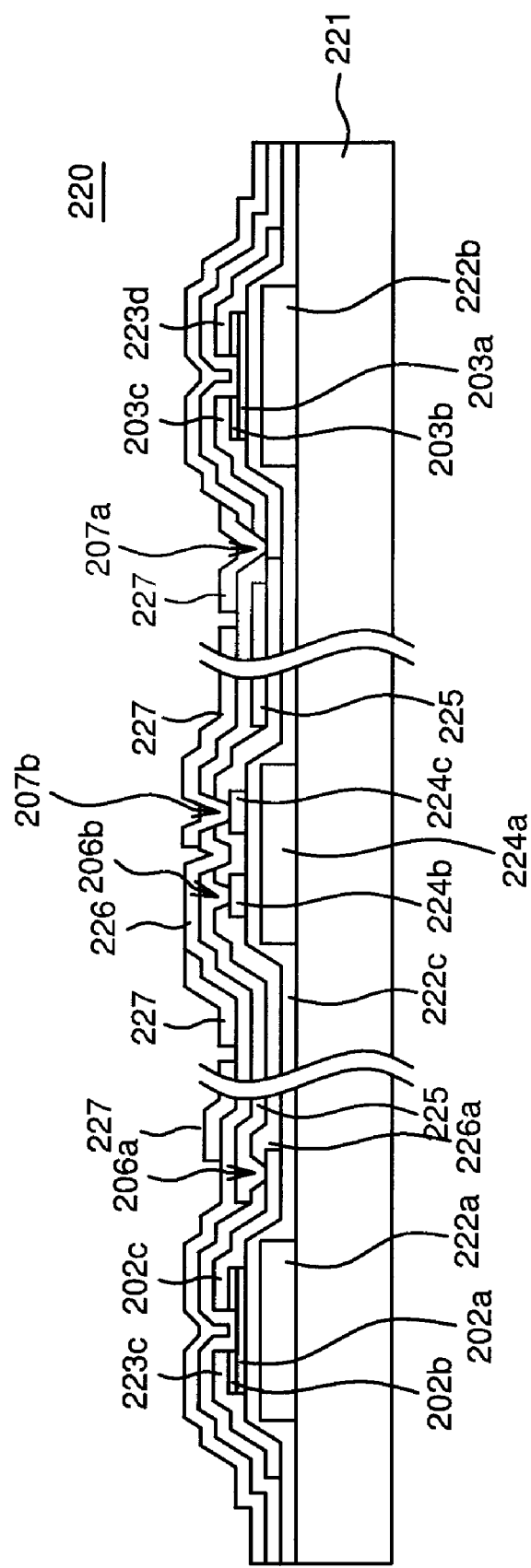

In FIG. 4J, second pixel electrode 227 may be formed on electrode insulating layer 226 and cover second contact holes 207a and 207b to electrically connect respectively to second drain electrode 203c of second TFT 203 and second auxiliary storage metallic layer 224c of the second storage capacitor to form TFT array substrate 220.

In one embodiment of the invention, an alignment layer and/or film may be formed on second pixel electrode 227 to lead or align the LC molecules in a vertical-alignment mode. First pixel electrode 225 and second pixel electrode 227 of TFT array substrate 220 may partially overlap to induce a multi-domain electric field without patterning or having to be precisely positioned with regard to the common electrode of the CF substrate. This may consequently prevent position errors and enhance display quality. Furthermore, TFT array substrate 220 may produce a wider viewing angle and lower color shift than associated with conventional devices and methods.

Figure 5A:
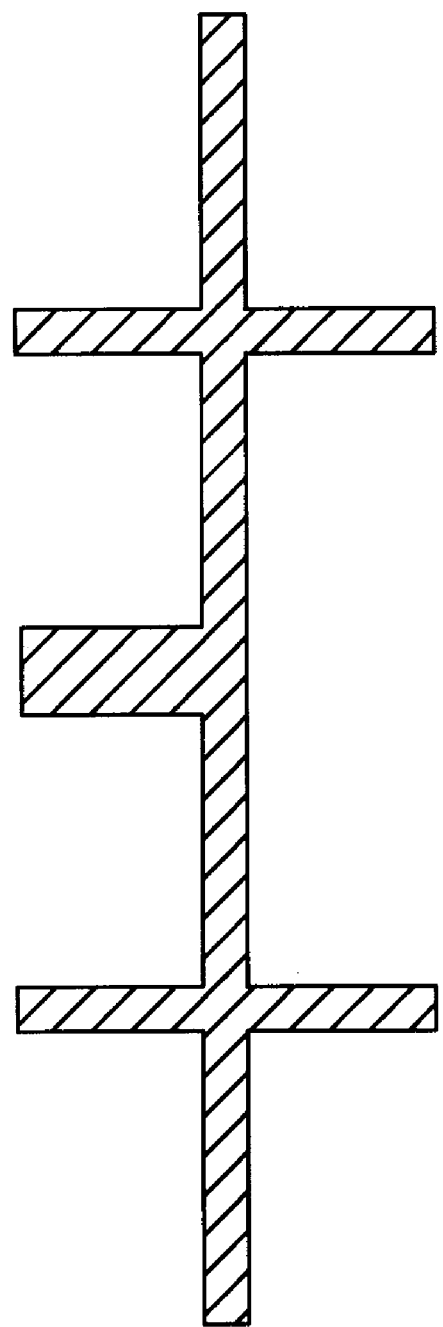
FIG. 5A is a top view of a pixel electrode of a TFT array substrate according to an embodiment of the invention.
Figure 5B:
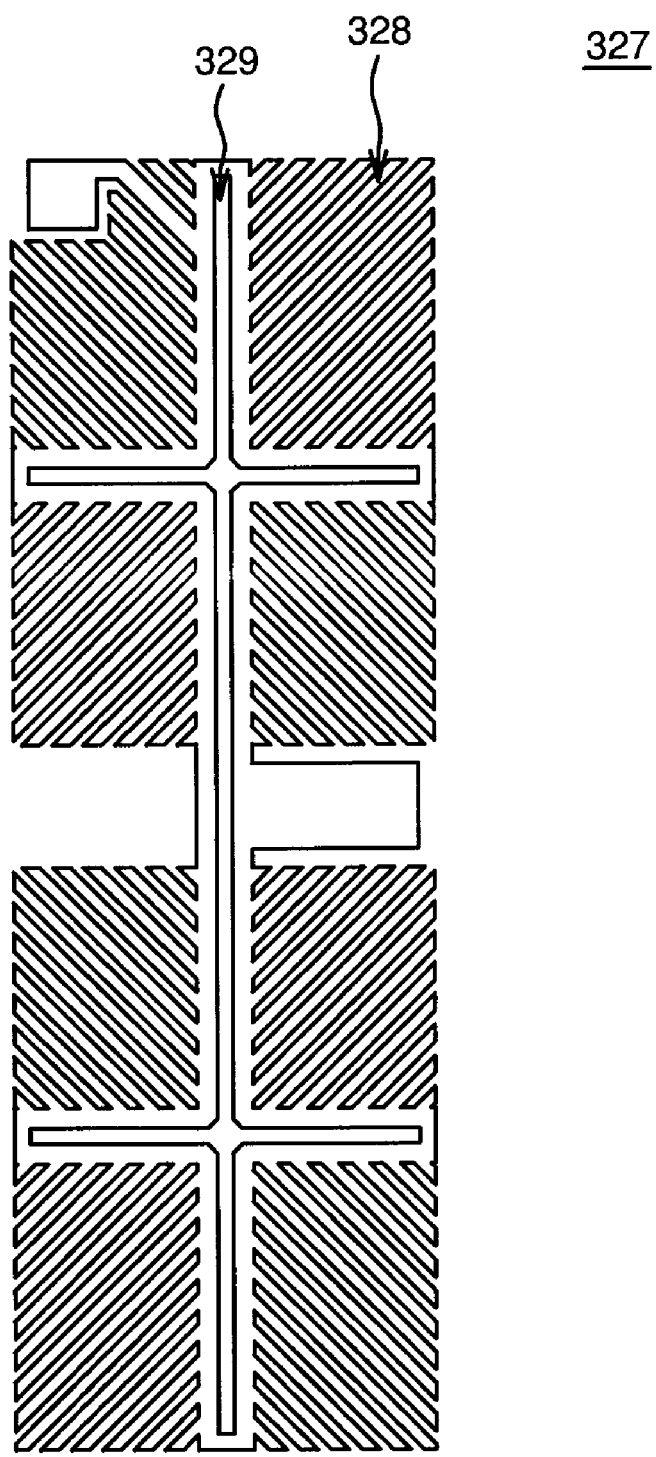
FIG. 5B is a top view of a pixel electrode of a TFT array substrate according to an embodiment of the invention.
Figure 5C:
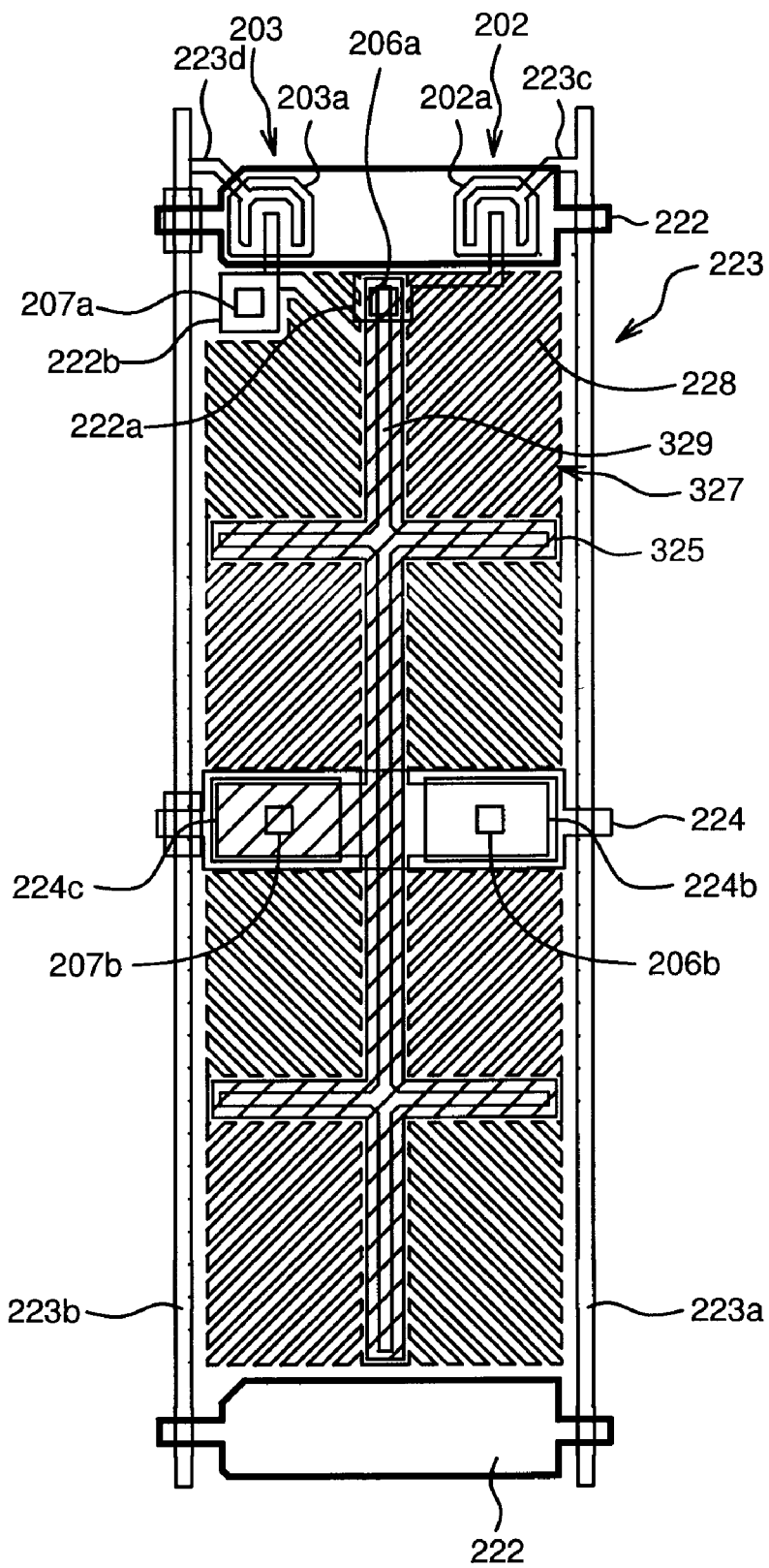
FIG. 5C is a layout view of a pixel region of a TFT array substrate according to an embodiment of the invention.

FIGS. 5A-B respectively include top views of first and second pixel electrodes of a TFT array substrate according to an embodiment of the invention. FIG. 5C is a layout view of a pixel region of a TFT array substrate according to an embodiment of the invention. Some reference numerals addressed above may be the same as used in FIGS. 5A-C. Construction for electrodes and pixel region of FIGS. 5A-C may be similar to aforementioned methods and thus are not detailed below.

First pixel electrode 325 may include a "crisscross" structure. Second slit 329 of second pixel electrode 327 may also include a crisscross structure corresponding to first pixel electrode 325. TFT array substrate 320 may thus induce a multi-domain electric field between first pixel electrode 325 and second pixel electrode 327.

In one embodiment of the invention, first pixel electrode of the present invention may include, for example, V-shape or crisscross forms. However, other embodiments are not so limited.

FIGS. 6A-D are schematic diagrams for manufacturing a TFT array substrate according to an embodiment of the invention. Some reference numerals addressed above may be the same as used in above figures. Construction for electrodes and pixel region of FIGS. 6A-D may be similar to aforementioned methods and thus are not detailed below.

Figure 6B:
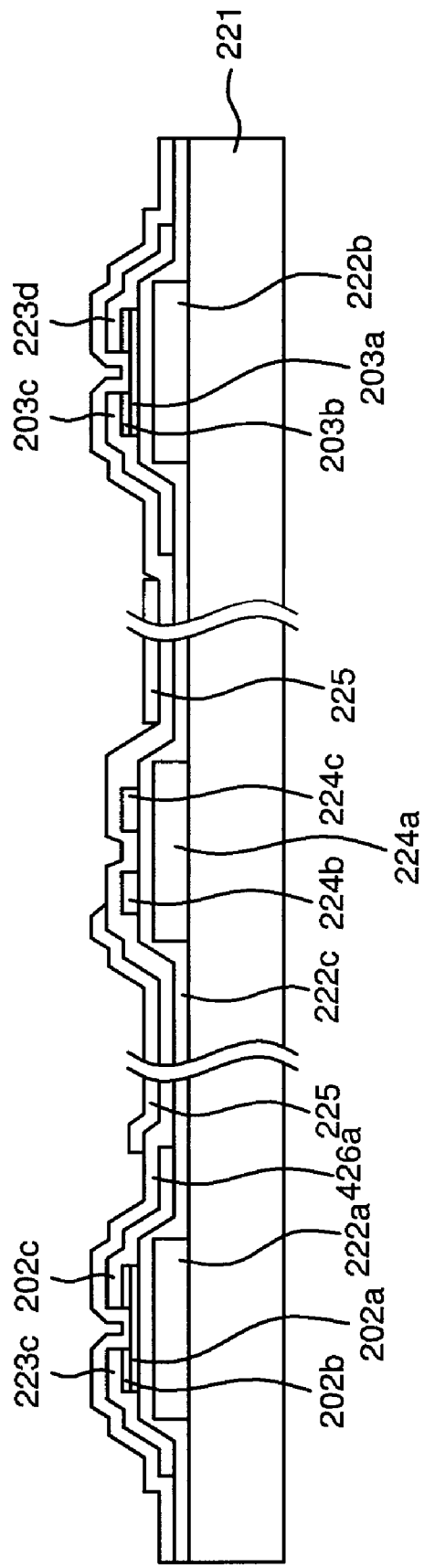
Figure 6C:
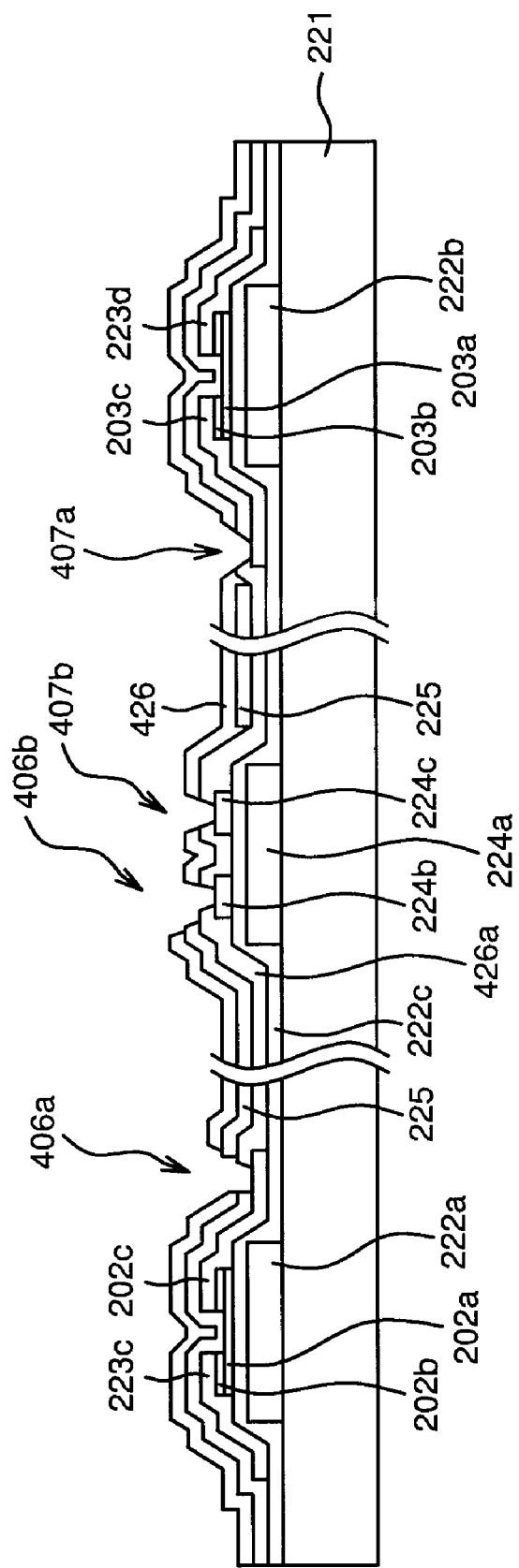
Figure 6D:
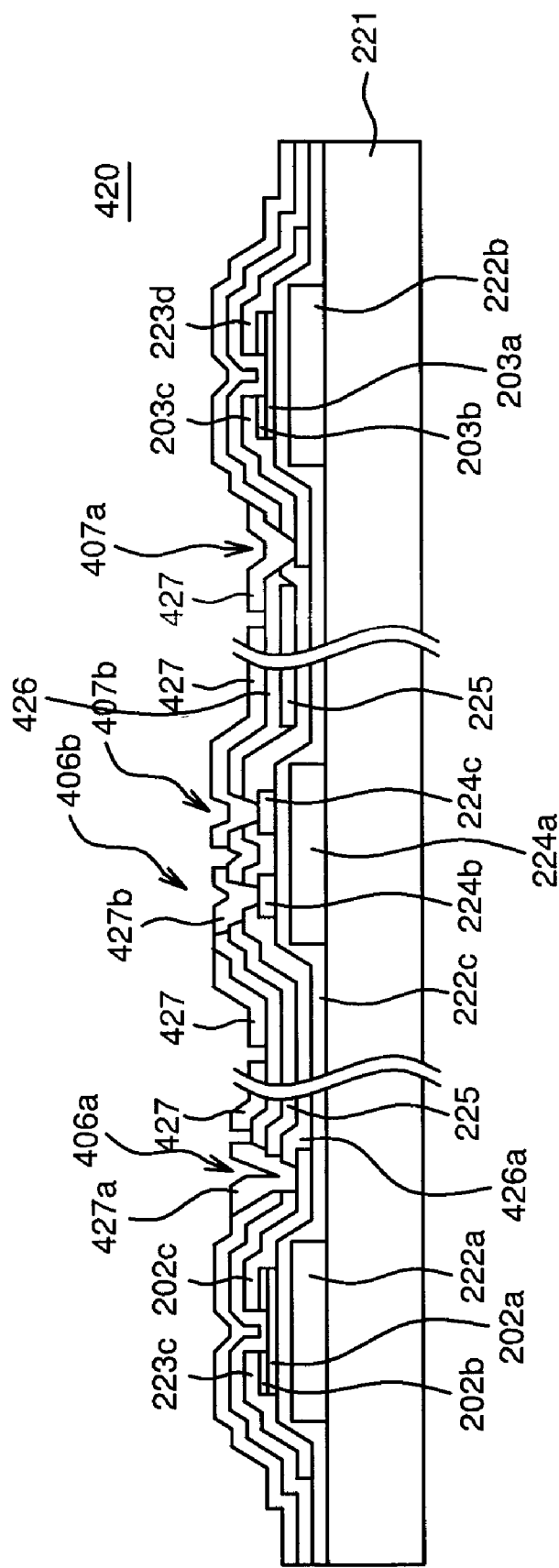

When forming insulating layer 426a of TFT array substrate 420, first contact holes 206a and 206b may not be formed. In other words, after forming first pixel electrode 225, electrode insulating layer 426 may be formed on (i.e., over) insulating layer 426a and first pixel electrode 225. First contact holes 406a and 406b and second contact holes 407a and 407b may be formed in insulating layer 426a. First contact holes 406a and 406b may respectively expose portions of first pixel electrode 225, first drain electrode 202c, and portions of first auxiliary storage metallic layer 224b. Second contact hole 407a and 407b may respectively expose portions of second drain electrode 203c and second auxiliary storage metallic layer 224c. In FIG. 6D, second pixel electrode 427 may be formed on electrode insulating layer 426. Portions of second pixel electrodes 427 may cover second contact holes 407a and 407b to electrically connect to second drain electrode 203c of second TFTs 203 and second auxiliary storage metallic layer 224c of the second storage capacitor. Each second pixel electrode 427 may include, for example, two electrical connecting portions 427a and 427b which may respectively cover first contact holes 406a and 406b but may not connect to other portions of second pixel electrodes 427. For example, electrical connecting portions 427a and 427b may be isolated from other portions of second pixel electrodes 427. Since electrical connecting portions 427a and 427b may at least cover the inner sidewall, first pixel electrode 225 may electrically connect to first drain electrode 202c and first auxiliary storage metallic layers 224b respectively using electrical connecting portions 427a and 427b. First pixel electrode 225 and second pixel electrode 427 of TFT array substrate 420 may partially overlap to form a multi-domain electric field to prevent or lessen a position error between the TFT array and CF substrates, and thus achieve a wide viewing angle and low color shift. Further, first contact holes 406a and 406b and second contact holes 407a and 407b may be formed after forming electrode insulating layer 426 to simplify the manufacturing process of the TFT array substrate.

Figure 7A:
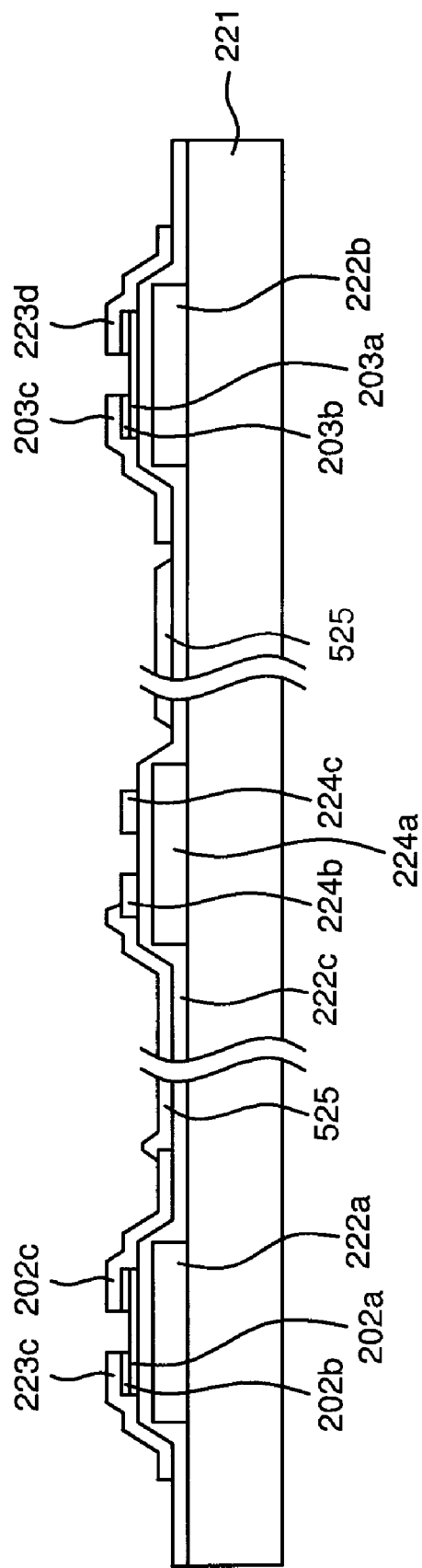
FIGS. 7A-C are schematic diagrams for manufacturing a TFT array substrate according to an embodiment of the invention.
Figure 7B:
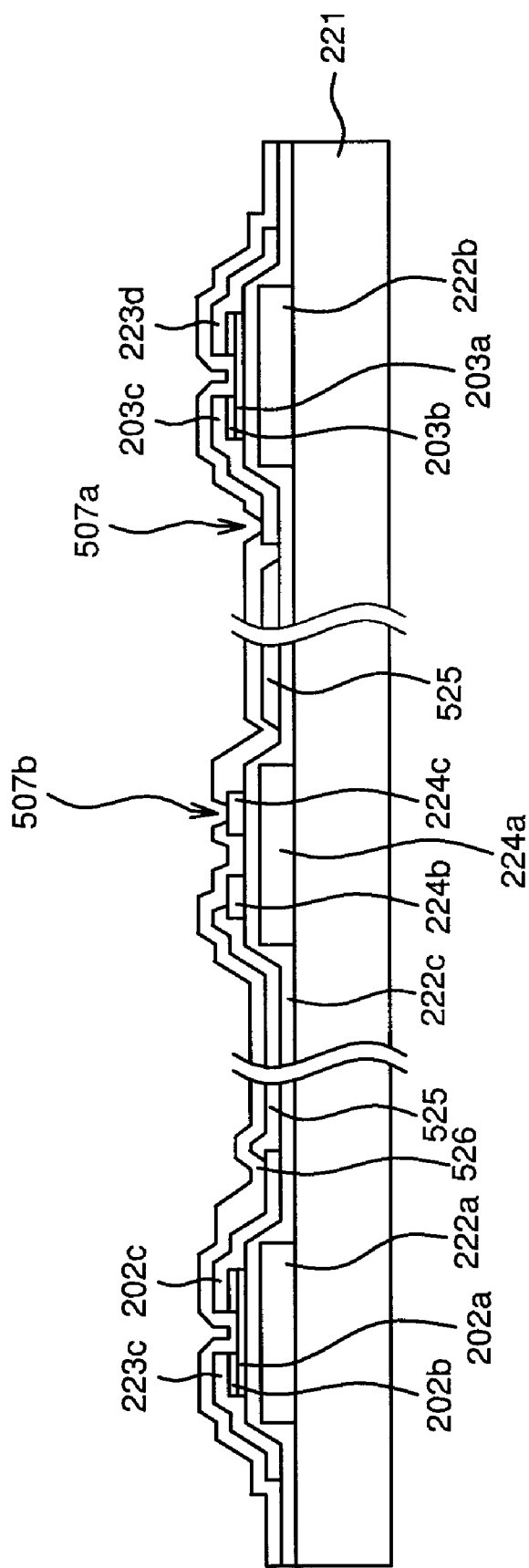
Figure 7C:
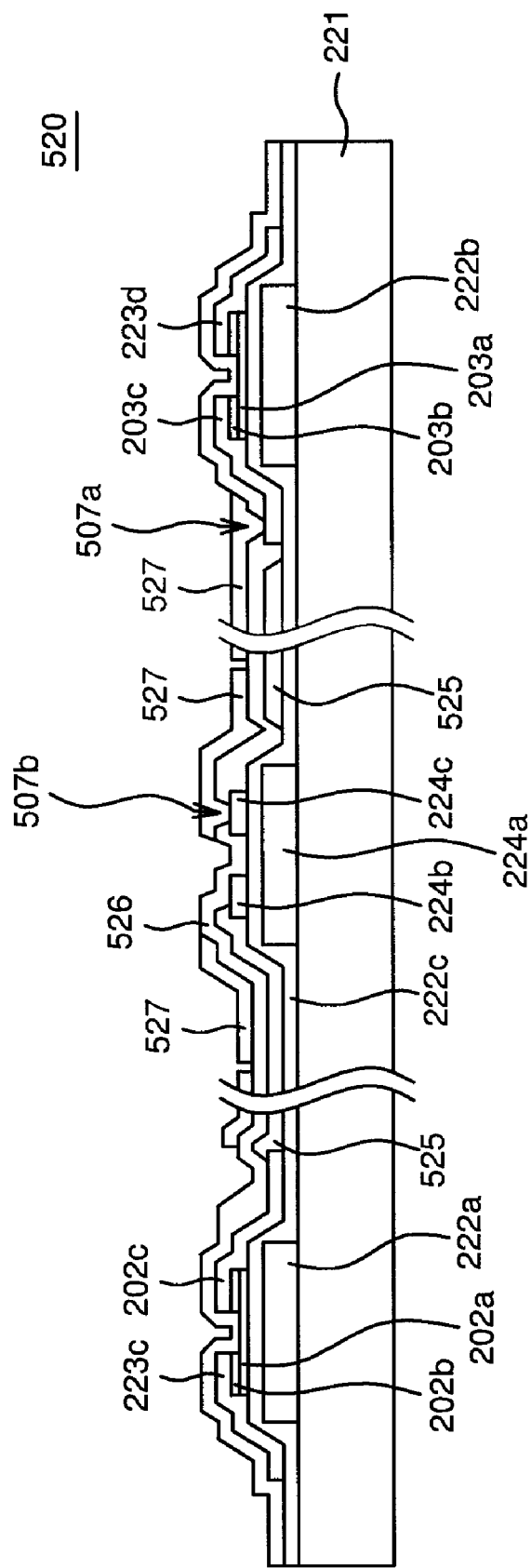

FIGS. 7A-C are schematic diagrams for manufacturing a TFT array substrate according to an embodiment of the invention. Some reference numerals addressed above may be the same as used in above figures. Construction for electrodes and pixel region of FIGS. 7A-C may be similar to aforementioned methods and thus are not detailed below.

After forming first TFT 202, second TFT 203, first and second storage capacitors, insulating layer 226a is not formed. Instead, in one embodiment of the invention, first pixel electrode 525 may be formed on substrate 221 and portions of first pixel electrodes 525 may cover first drain electrode 202c of first TFT 202 and the first auxiliary storage metallic layers 224b of the first storage capacitors. First pixel electrode may electrically connect to first TFT 202 and the first storage capacitors. First pixel electrode 525 may directly contact gate insulating layer 222c. Electrode insulating layer 526 may be formed on first TFT 202, second TFT 203, the first storage capacitors, the second storage capacitors, and first pixel electrodes 525. Electrode insulating layer 526 may include second contact holes 507a and 507b, which may respectively expose portions of second drain electrode 203c and second auxiliary storage metallic layers 224c. Second pixel electrode 527 may be formed on electrode insulating layer 526 and may cover second contact holes 507a and 507b. Second pixel electrode 527 may electrically connect to second drain electrode 203c of second TFT 203 and second auxiliary storage metallic layers 224c of the second storage capacitors. First pixel electrode 525 and second pixel electrode 527 of TFT array substrate 520 may partially overlap to induce a multi-domain electric field to prevent or lessen occurrences of position error between the TFT array and CF substrates and achieve a wider viewing angle and lower color shift sometimes associated with conventional methods and devices. Further, to simplify the manufacturing process of the TFT array substrate, insulating layer 226a need not be formed between first pixel electrode 525 and second pixel electrode 527.

Thus, various embodiments of the TFT array substrate, manufacturing method, and applications thereof may induce multi-domain electric field to broaden viewing angles and prevent or lessen occurrences of the position error between the TFT array and CF substrates to enhance display quality. Furthermore, the TFT array substrate of the present invention may reduce any color shift problem.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A liquid crystal (LC) display device, comprising:
   a substrate, an electrode insulating layer, and an LC layer;
   a first plurality of pixel electrodes, including a first pixel electrode, formed between the substrate and the electrode insulating layer;
   a second plurality of pixel electrodes, including a second pixel electrode, formed between the LC layer and the electrode insulating layer;
   a pixel region including the first and second pixel electrodes and a storage capacitor electrode, the second pixel electrode including first and second enclosed slits, wherein the first slit does not overlap the first pixel electrode and the second slit overlaps the first pixel electrode, and the storage capacitor electrode partially overlaps the first slit and the second slit; and
   a first auxiliary storage metallic layer and a second auxiliary storage metallic layer disposed on the storage capacitor electrode, wherein the first auxiliary storage metallic layer overlaps the second slit and the second auxiliary storage metallic layer overlaps the first slit.

2. The device of claim 1, wherein the substrate includes data lines and gate lines that overlap to form a plurality of pixel regions including the pixel region, each pixel region including a first thin film transistor (TFT) to electrically connect to a first gate line included in the gate lines and a first data line included in the data lines.

3. The device of claim 2, wherein the gate lines and the data lines include a first material different from a second material included in the first pixel electrodes and the second pixel electrodes.

4. The device of claim 2, wherein the pixel region includes one of the first TFTs and a second TFT, the first pixel electrode to electrically connect to the one of the first TFTs and the second pixel electrode to electrically connect to the second TFT.

5. The device of claim 2, wherein first pixel electrode directly contacts a gate insulating layer formed on one of the first TFTs.

6. The device of claim 2, wherein the first pixel electrode includes a total area generally between ⅓ and ½ of a total area of the pixel region.

7. The device of claim 1, wherein the first pixel electrode is formed in a "V" shape.

8. The device of claim 1, further comprising an insulating layer between the substrate and the first plurality of pixel electrodes.

9. The device of claim 1, wherein the first pixel electrode is to electrically connect to a first voltage level, the second pixel electrode is to electrically connect to a second voltage level, and the first voltage level is to be greater than the second voltage level.

* * * * *